DIGITAL TRIP SYSTEM

Filed Nov. 27, 1961 3 Sheets-Sheet 1

ARTHUR H. BROOK &
JAMES R. CAMPBELL
INVENTORS

BY John G. Graham

ATTORNEY

DIGITAL TRIP SYSTEM

Filed Nov. 27, 1961 3 Sheets-Sheet 2

ARTHUR H. BROOK &
JAMES R. CAMPBELL
INVENTORS

BY John G. Graham

ATTORNEY

DIGITAL TRIP SYSTEM

Filed Nov. 27, 1961 3 Sheets-Sheet 3

ARTHUR H. BROOK &
JAMES R. CAMPBELL
INVENTORS

BY John G. Graham

ATTORNEY

United States Patent Office 3,248,694

Patented Apr. 26, 1966

3,248,694

DIGITAL TRIP SYSTEM

Arthur H. Brook and James R. Campbell, both of Houston, Tex., assignors to Texas Instruments Incorporated, Dallas, Tex., a corporation of Delaware Filed Nov. 27, 1961, Ser. No. 155,087

7 Claims. (Cl. 340—146.1)

This invention relates to a system adapted to accept multi-digit information and to energize high or low trip indicators when the value of the number represented by such information is outside a selected range.

It is often necessary to monitor digital register and actuate an indicator or recording device when the number on the register exceeds or is less than preselected reference values. For example, in a system for automatically testing transistors or other electrical components, the parameter measured may be represented by an analog voltage level which would be converted to a digital manifestation on a storage register for subsequent indication or recording. This operation might be accomplished by a digital voltmeter. It would also be useful to indicate at the same time whether or not the measured parameter fell within acceptable limits, rather than requiring an operator to compare mentally the output reading with the high and low limits. It might be necessary for the system also to actuate a reject mechanism when the value of the parameter is outside the acceptable limits, permitting mechanical handling. The high and low limits in such a system must be readily established by a mechanism such as a punched card reader.

Accordingly, it is a principal object of this invention to provide an improved digital trip system. Another object is to provide apparatus for producing an indication when the value of a number appearing on a digital register is outside a selected range. A further object is to provide a digital trip system adapted for high and low trip functions with several decimal digits.

In accordance with this invention, a trip system is provided by using each digit of a register to control one of a plurality of switching units. The desired trip level is programmed into the switching units by suitable means such as a card reader. The switching units are adapted to energize a trip indicator when the number on the register is outside the range established by the trip lever. The trip indicator is energized directly from a switching unit corresponding to the digit of greatest significance if the number in the register is higher than the selected trip level for this digit, but if it is equal to the selected level, the indicator is energized through the switching units for the lower significant digits. Depending upon the programming of the switching units, the system may be adapted to either high or low trip operation, or for both if two separate channels are provided.

Figure 1:
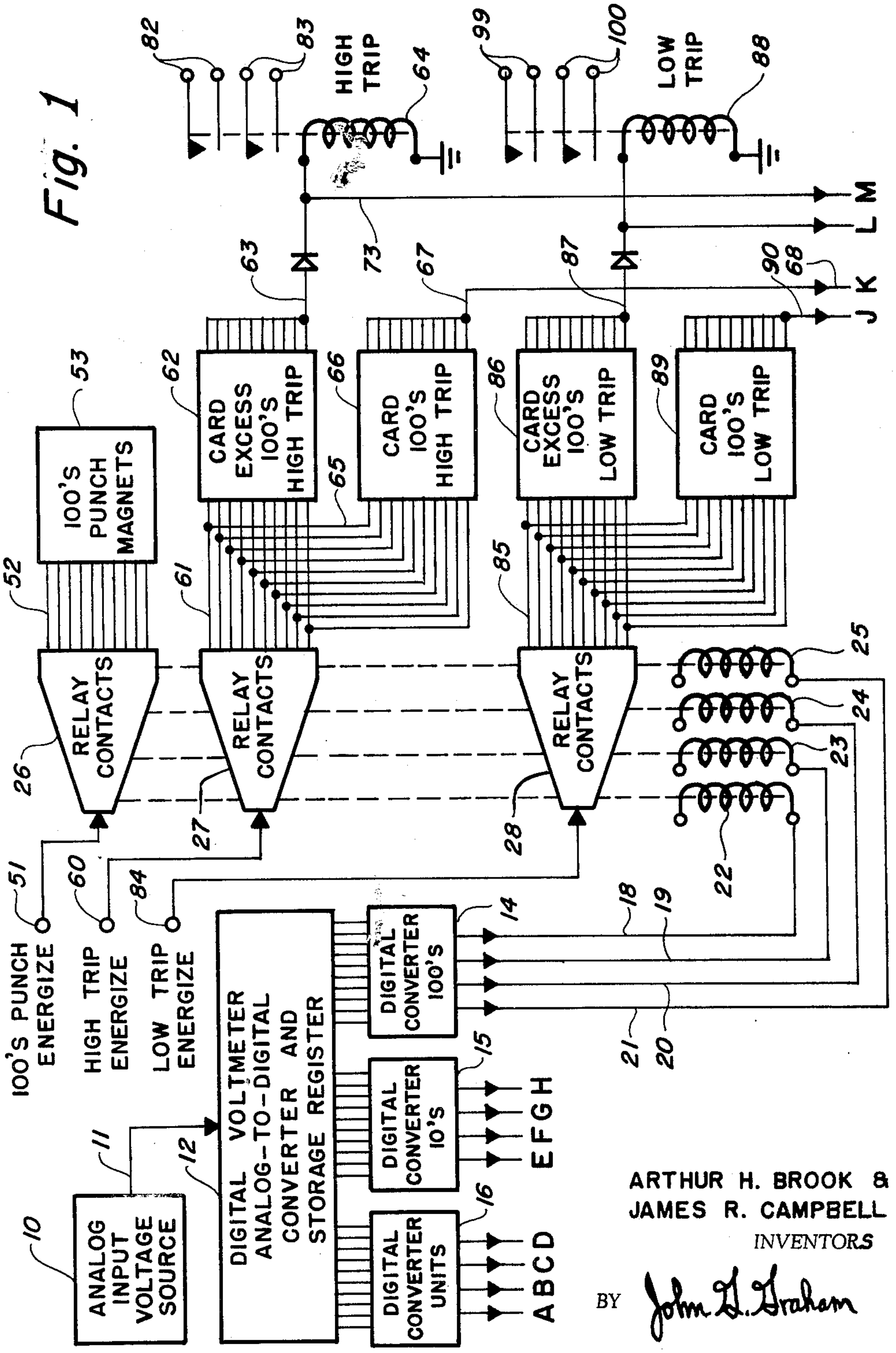
Figure 1A:
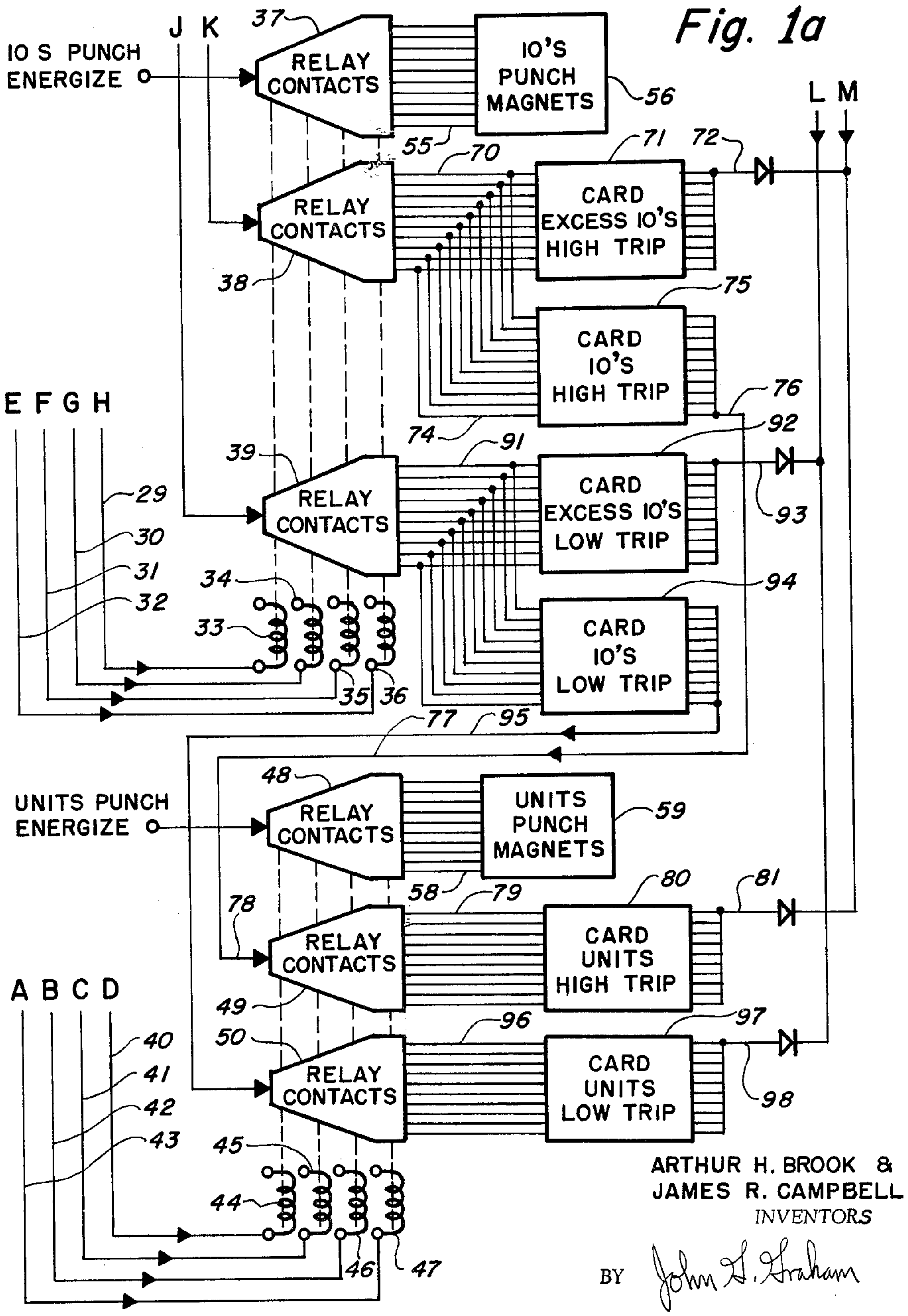
Figure 2:
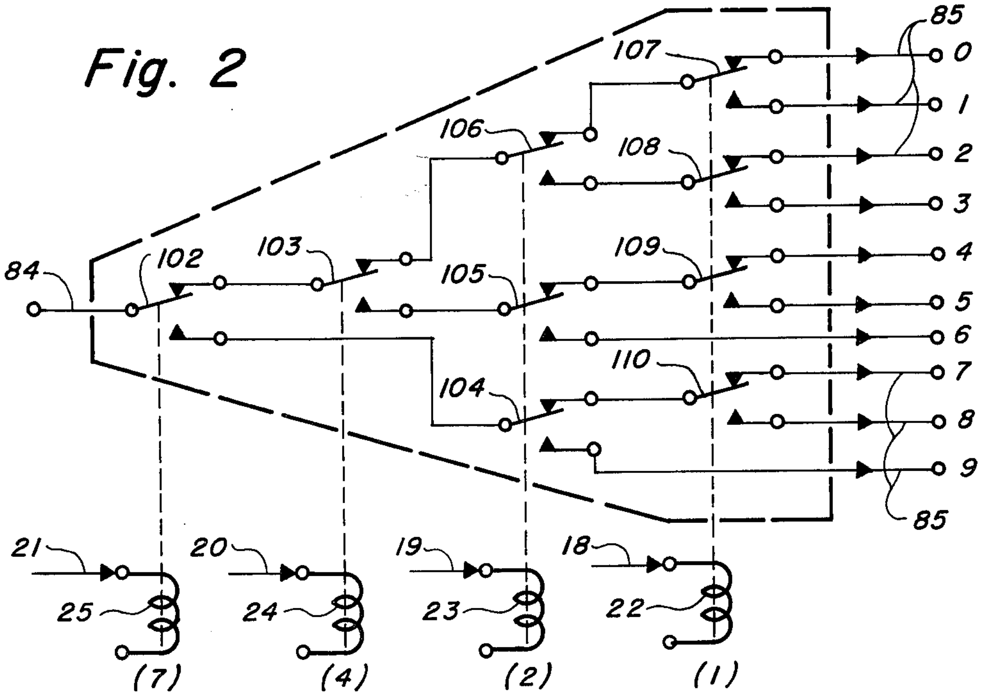
Figure 3:
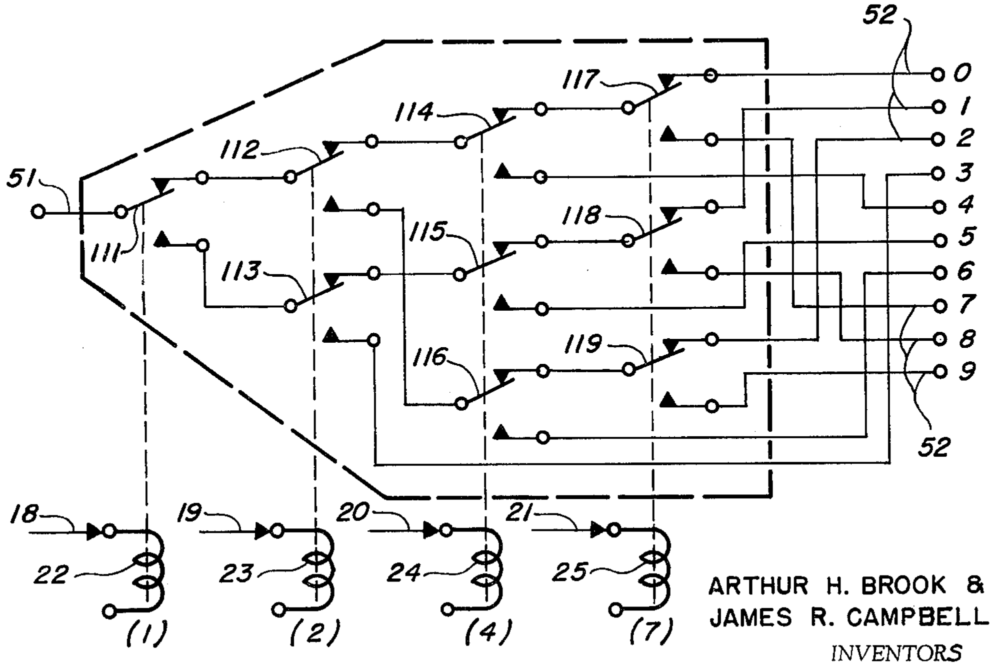

The novel features believed characteristic of this invention are set forth in the appended claims. The invention itself, however, as well as further objects and advantages thereof, will best be understood from the following detailed description of an illustrative embodiment, when read in conjunction with the accompanying drawings, wherein:

FIGURE 1 is a block diagram of a portion of a digital trip system incorporating the principal features of this invention;

FIGURE 1*a* is a block diagram of the remainder of the system of FIGURE 1;

FIGURE 2 is a schematic diagram of a relay contact network suitable for use in the system of FIGURE 1; and FIGURE 3 is a schematic diagram of another relay contact network suitable for use in the system of FIGURE 1.

With reference to FIGURE 1, an analog input voltage, which may be representative of the measured parameter in a transistor tester as suggested above, is seen connected from a source 10 to an input 11 of analog-to-digital converter and storage register 12. This analog-to-digital converter may be of the type adapted to provide a suitable readout in decimal digital form. Converters of this type are commercially available under the trade designation Series 200 Digital Voltmeters from the Systron-Donner Corporation of Concord, California, for example. A digital voltmeter of this type includes a storage register or some manifestation of the voltage measured, and so an output is available which includes a parallel decimal representation of each digit. The converter and storage register 12 is shown to include a three digit output, each digit being represented by the energization of one of ten parallel lines. The three digits are arbitrarily designated the 100's, 10's, and units. Of course, the system as subsequently described could include more or less than three digits or could account for a decimal point. The hundreds representation is applied by ten parallel lines to a decimal to binary-coded-decimal converter 14. This converter 14 merely changes the ten line representation to a four line representation of each digit. The four lines represent a combination such as 1, 2, 4 and 7 whereby any of the numbers 0–9 may be represented by energization of appropriate combinations of the lines. In a like manner the 10's representation is applied to a decimal to binary-coded-decimal converter 15, and the units representation to a converter 16. The hundreds representation from the converter 14 is applied by a set of four lines 18–21 to a set of four relay coils 22–25 which correspond to the numbers 1, 2, 4 and 7 respectively. These relay coils 22–25 operate a switching network comprising a large number of contacts in a set of three "relay trees" or contact networks 26, 27 and 28. Each of these contact networks is adapted to set up a conductive path from a single input to one line of a ten line parallel output corresponding to a particular number as determined by the representation in the 100's portion of the storage register 12. As explained below, the contact networks 26, 27 and 28 are portions of the 100's output punch, high trip, and low trip operations, respectively. The 10's digit decimal to coded-decimal converter 15 is likewise connected as seen in FIGURE 1*a* by four lines 29–32 to a set of four relays 33–36 corresponding to the numbers 1, 2, 4 and 7. These relays 33–36 energize or actuate contacts in a switching network comprising three relay trees or contact networks 37, 38 and 39, corresponding to the 10's punch and the high and low trip functions. In a like manner, the units digit converter 16 is connected by four lines 40–43 to a set of relay coils 44–47 respresenting 1, 2, 4 and 7. The coils 44–47 actuate appropriate contacts in a switching network comprising a set of three relay contact networks 48, 49 and 50 which correspond to the units punch and high and low trip operations.

The relay contact network 26 is adapted to establish a conductive path between an input terminal 51 and the appropriate one of a set of ten parallel lines 52 which are connected to the hundreds digit punch magnets 53 in a card punch recording machine such as that commercially available under the trade designation IBM 526 Summary Punch. Thus, when the recording machine reaches a point at which the hundreds digit is to be punched, then an appropriate supply voltage is applied to the terminal 51, and, depending upon which of the coils 22–25 is energized, a path will be established to one of the lines 52 which will energize the appropriate one of the magnets 53. In the tens group, the contact network 37 is likewise adapted to connect an input terminal 54 to one of a set of lines 55 which are connected to the tens digit punch magnets 56 in the recording machine. In a similar manner, the units group includes an input terminal 57 which is connected to one of a set of ten parallel lines 58 by the relay contacts 48. As above, this arragement allows only one of a set of units punch magnets 59 in the recording machine to be energized at any one time as determined by which of the coils 44–47 are energized.

In the high trip portion of the system, the relay contact network 27 in the hundreds digit group is adapted to connect a supply voltage input terminal 60 to one of a set of ten parallel lines 61. The lines 61 are connected to a group 62 of switching means in a card reader. Of course, a matrix of single-pole, single-throw switches could be used instead of a card reader. The output terminals from the card reader for this contact group 62 are connected in common to a line 63 which is connected through a diode to a high trip relay coil 64. That portion of a card which would be inserted in the card reader corresponding to the contact group 62 would be punched to provide conductive paths between certain of the lines 61 and the line 63. In this portion of the high trip operation, it is necessary to connect the lines 61 to the line 63 for the hundreds digits above the digit at which it is desired for the high trip relay to function. That is, if the high trip value is to be 375 volts or above, for example, then the card would be punched to establish conductive paths from the fourth through ninth of the lines 61 to the line 63. In this example, the 0–3 lines would be open in the contact group 62.

To provide the high trip function for the 10's digit, or when the three line in the group 61 is energized, the lines 61 are further connected by a set of ten lines 65 to a group of contacts 66 in the card reader. The output terminals from the contact group 66 are connected in common to a line 67 which is connected by a conductor 68 to an input 69 of the relay contact network 38 in the tens portion of the system, as seen in FIGURE 1*a*. The network 38 is adapted to connect the input 69 to one of a set of ten parallel lines 70 as determined by which of the coils 33–36 are energized. The lines 70 are connected to a group of contacts 71 in the card reader while the output terminals of this contact group are connected to a common line 72. This line 72 is connected by a conductor 73 to the high trip relay coil 64. The portion of the card corrseponding to the contact group 71 is punched to establish contact between certain ones of the lines 70 and the line 72. In the example above, if the high trip condition is 375, the portion of the card corresponding to the contact group 71 would be punched to establish contact between the eighth and ninth of the lines 70 to the line 72. Thus far, it is seen that a reading of 380 or above would set a high trip condition.

To account for the units digit, the lines 70 are connected by a set of ten lines 74 to a card reader contact group 75, the portion of the card corresponding to this group being punched to establish contact for the number 7 alone, the remaining contacts being open in the 375 example. The output terminals of the contact group 75 are connected in common to a line 76 which is connected by a conductor 77 to an input 78 of the relay contact network 49 in the units portion of the system. The relay contacts 49 are adapted to connect the input 78 to one of a set of ten parallel lines 79, which are connected to a contact group 80 in the card reader. The output terminals of the contact group 80 are connected in common to a line 81 which is connected through a diode and the line 73 to the high trip relay coil 64. The portion of the card corresponding to the contact group 80 would be punched to establish contact for numbers above the desired high trip condition in the units digit. In the example above, the contact group 80 would connect the fifth through ninth of the lines 79 to the common line 81 for a 375, high trip condition. It is thus seen that a number of 375, or anything above this, would establish a condition whereby the high trip relay coil 64 would be actuated if the high trip input terminal 60 was energized. The coil 64 may operate any suitable number of contacts. For example, a set of contacts 82 may be used to punch a high trip indication in the recording device while a set of contacts 83 may be used to energize an indicator light or alarm means.

The low trip portion of the system is exactly the same as the high trip portion, the only difference being the way in which the card is punched prior to insertion in the card reader. In the hundreds digit portion, the relay contacts 28 connect a low trip supply input terminal 84 through a set of lines 85 to a contact group 86 on the card reader. The output termnials of the contact group 86 are connected by a common line 87 to a low trip relay coil 88. If the desired low trip condition is 235, for example, then the contact group 86 would establish conductive paths for the 0 and 1 lines only, allowing the relay 88 to be energized for all numbers below 200. To provide a low trip function in the two hundred range, the lines 85 are also connected to a contact group 89 in the card reader which, in the above example, would be adapted to establish a conductive path for only the "two" line between the output of the relay contact network 28 and a line 90. As seen in FIGURE 1*a*, the line 90 is connected to the input of the relay contact network 39 in the tens portion of the system, this network being adapted to establish contact between the line 90 and one of a set of ten parallel lines 91. These lines 91 are connected to a contact group 92 in the card reader. The common output terminals of the contact group 92 are connected through a line 93 to the low trip relay coil 88. The portion of the card corresponding to the contact group 92 should be punched to establish contact for the zero, one and two lines in the 235 low trip example. To account for the units digit in the low trip, the lines 91 are further connected to a contact group 94 in the card reader, the portion of the card corresponding to this group being punched to establish contact for the three line or 230 condition in the 235 volt low trip example. The common output terminals of the contact group 94 are connected by a line 95 to the input of the relay contact network 50 in the units portion of the system. The relay contacts 50 connect the line 95 to one of a set of ten parallel lines 96 as determined by which of the coils 44–47 are energized. The lines 96 are in turn connected to a contact group 97 in the card reader while the output terminals of the contacts in this group are connected in common to a line 98 and to the low trip relay coil 88. In the example above, the portion of the card corresponding to the contact group 97 would be punched to connect zero through five of the lines 96 to the line 98, the remainder of the lines being open.

It is thus seen that, for the example described, any number in the register 12 of 235 or below will establish a condition wherein the low trip relay coil 88 will be actuated if the low trip input 84 is energized. The relay coil 88 may include any suitable number of contacts to indicate or control as necessary. As shown, the low trip relay includes a pair of contacts 99 which may be connected to the output recorder so that an indication may be punched if the low trip is energized. Also the low trip relay includes a pair of contacts 100 which may be connected to energize an indicator or alarm.

With reference to FIGURE 2, there is shown a switching network in the form of a "relay tree" or relay contact network such as may be used in each of the contact arrangements 26, 27, 28, 37, 38, 39, 48, 49 and 50 of FIGURE 1. Specifically, the contact arrangement 28 is shown wherein the low trip supply input terminal 37 is seen connected to a single-pole double-throw relay armature 102. This armature is normally in the upper position but is pulled down to the lower position by the energization of the relay coil 25 corresponding to the number 7 in the coded-decimal numerical system. The upper contact for the armature 102 is connected to an armature 103 which is actuated by the relay coil 24 corresponding to the number 4. The lower contact for the armature 102 is connected to an armature 104. The lower and upper contacts for the armature 103 are connected to single-pole double-throw relay armatures 105 and 106, respectively. All three of the armatures 104, 105 and 106 are actuated by the relay coil 23 corresponding to the numeral 2. The upper contact for the armature 106 is connected to a double-throw relay armature 107 while the lower contact is connected to an armature 108. The upper contact for the armature 105 is connected to an armature 109 while the lower contact is connected to the sixth of the lines 85. The upper contact for the armature 104 is connected to an armature 110 while the lower contact is connected to the ninth of the lines 85. The remainder of the lines 85 are connected to the contacts of the armatures 107–110 as shown, all four of these armatures being operated by the relay coil 22 corresponding to the numeral 1. It is seen that contact will be established between the input line 84 and only one of the lines 85, depending upon which of the coils 22–25 are energized. If none are energized, contact will be established between the line 84 and the line 85 which corresponds to zero. To contact the fifth of the lines 85, for example, the coils 22 and 24 would be energized, representing 1 and 4 respectively, establishing a conductive path from the line 84 through the upper contact of the armature 102, the lower contact of the armature 103, the upper contact of the armature 105, and the lower contact of the armature 109.

Another example of the "relay tree" type of contact arrangement such as used in the switching networks 26, 27, etc. is shown in FIGURE 3, wherein the contact network 26 is illustrated specifically. The line 51 is connected to an armature 111 which is actuated by the relay coil 21 representing the numeral 1 in the coded-decimal system. The upper contact of the armature 111 is connected to an armature 112 while the lower contact is connected to an armature 113. Both of the armatures 112 and 113 are operated by the relay coil 23 which represents the numeral 2. The upper contacts of the armatures 112 and 113 are connected to armatures 114 and 115, while the lower contact of 112 is connected to an armature 116. The armatures 114, 115, 116 are all operated by the relay coil 24, representing the numeral 4. The lower contact of the relay 113 is connected to the output line 52 which represents three. The upper terminals of the armatures 114, 115, and 116 are connected to armatures 117, 118, and 119, respectively, these armatures being operated by the relay coil 25 which represents the numeral 7. The lower contacts of the armatures 114, 115, and 116 are connected to the lines 52 which represent the numerals 4, 5 and 6, respectively. The remainng contacts of the armatures 117, 118, and 119 are connected to appropriate ones of the output lines 52, completing a parallel decimal representation including zero through nine. A conductive path may be completed from the input line 51 to a particular one of the output lines 52 by energizing the proper one or ones of the relay coils 22–25.

Instead of the 1–2–4–7 coded-decimal arrangement of FIGURES 2 and 3, any other numerical system could be utilized, such as 1–2–4–8 or 1–2–2–4, for example. Also, the system output need not be decimal in nature, but could be octal, or could employ any other radix which might be suitable, although the decimal arrangement is particularly well suited for use in a transistor tester where the output should be meaningful to unskilled operators. Further, the system obvioulsy could be arranged to trip or more or less than three digits, or to trip on only the two most significant of three digits, for example.

Accordingly, even though the invention has been described with reference to a particular embodiment, this description is not meant to be construed in a limiting sense. It is of course understood that various modifications may be made by persons skilled in the art, and so it is contemplated that the appended claims will cover any such modifications as fall within the true scope of the invention.

What is claimed is:

1. A digital trip system comprising a multi-digit register, a first switching unit having an input and first and second outputs, first and second channels in said first switching unit interconnecting said input with said first and second outputs respectively, said first and second channels including switching means controlled by a first digit in said register, said first channel including switching means selectively programmable according to integers other than that of a predetermined value for said first digit, said second channel including switching means selectively programmable according to the particular integer of said predetermined value of said first digit, a second switching unit having an input connected to said second output and having an output, said second switching unit including switching means controlled by a second digit in said register and including switching means selectively programmable according to integers other than that of said predetermined value for said second digit, and utilization means having input means connected to said first output of said first switching unit and to said output of said second switching unit.

2. A digital trip system comprising a register for providing a parallel representation of a multi-digit number, a first switching unit having input means and first and second output means, first and second channel means in said first switching unit interconnecting said input means and said first and second output means respectively, said channel means including switching means controlled by a first digit in said register, said first channel means including switching means selectively programmable according to integers above a predetermined upper limit and below a predetermined lower limit for said first digit, said second channel means including switching means selectively programmable according to the particular integers of said upper and lower limits for said first digit, a second switching unit having input means connected to said second output means of said first switching unit and having output means, said second switching unit including switching means controlled by a second digit in said register and including switching means selectively programmable according to integers other than that of said upper and lower limits for said second digit, and utilization means having input means connected to said first output means of said first switching unit and to said output means of said second switching unit.

3. In apparatus for monitoring a register and actuating indicating means when the number in said register is outside a selected range:

(a) first switching means adapted to be selectively closed in accordance with integers above that of an upper limit of said range for one digit and below that of a lower limit of said range for said one digit, (b) second switching means adapted to be selectively closed in accordance with the particular integers of said upper and lower limits of said range for said one digit, (c) each of said first and second switching means having input means and parallel output means corresponding to the radix of the number system of said register, (d) a first switching network having input means and parallel output means corresponding to said radix and being adapted to establish conductive paths between said input means and said output means according to said one digit in said register, (e) conductive means for supplying voltage to the input means of said first switching network, (f) conductive means for connecting the output means of said first switching network to the input means of said first and second switching means, (g) third switching means adapted to be selectively closed in accordance with integers above that of said upper limit of said range for another digit and below that of said lower limit of said range for said another digit, (h) said third switching means having input means and parallel output means corresponding to said radix, (i) a second switching network having input means and parallel output means corresponding to said radix and being adapted to establish conductive paths between said input means and said output means according to said another digit in said register, (j) conductive means connecting the output means of said second switching means to the input means of said second switching network, (k) conductive means connecting the output means of said second switching network to the input means of said third switching means, (l) said indicating means having input means connected to the output means of said first and third switching means.

4. A digital trip system for actuating utilization means when the number on a multi-digit register exceeds a preselected limit comprising:

(a) a first switching network having an input and a plurality of parallel outputs corresponding to the radix of numbers in said register, said input being connected to voltage supply means, said first switching network being adapted to establish a conductive path between its input and one of its outputs in response to one digit of the number in said register, (b) a first group of switching means having a plurality of parallel inputs connected to said outputs of said first switching network and having first and second outputs, said first group being selectively programmable to establish conductive paths from its inputs to said first output corresponding to integers above that of said limit for said one digit and to establish conductive paths from its inputs to said second output corresponding to the particular integer of said limit for said one digit, (c) a second switching network having an input connected to said second output of said first group and having a plurality of parallel outputs corresponding to said radix, said second switching network being adapted to establish a conductive path between its input and one of its outputs in response to another digit in said register of next lower significance than said one digit, (d) a second group of switching means having a plurality of parallel inputs connected to said outputs of said second switching network and having an output, said second group being selectively programmable to establish conductive paths from its inputs to its output corresponding to integers above that of said limit for said another digit, (e) and voltage responsive utilization means having input means connected to said first output of said first group and to said output of said second group.

5. A trip system adapted to actuate indicating means when an input voltage is outside a selected range comprising:

(a) an analog-to-digital converter connected to receive said input voltage and adapted to provide a parallel multi-digit representation thereof on a decimal register, (b) a first switching network having an input and ten parallel outputs and being adapted to establish a conductive path between its input and one of its outputs according to a first digit in said register, (c) a first group of switching means adapted to be selectively closed in accordance with integers other than that of a limit of said selected range for said first digit, (d) a second group of switching means adapted to be selectively closed in accordance with the particular integer of said limit of said range for said first digit, (e) each of said first and second groups having an output and ten parallel inputs, (f) conductive means for supplying voltage to the input of said first switching network, (g) conductive means for connecting the ten parallel outputs of said first switching network to the ten parallel inputs of said first and second groups, (h) a second switching network having an input and ten parallel outputs and being adapted to establish a conductive path between its input and one of its outputs according to a second digit in said register of less significance than said first digit, (i) a third group of switching means adapted to be selectively closed in accordance with integers other than that of said limit of said range for said second digit, (j) said third group having an output and ten parallel inputs, (k) conductive means connecting the output of said second group to the input of said second switching network, (l) conductive means connecting the ten parallel outputs of said second switching network to the ten parallel inputs of said third group, (m) said indicating means having input means connected to the outputs of said first and third groups.

6. Apparatus for actuating indicating means when the number on a multi-digit register is equal to or greater than an upper limit and when said number is equal to or less than a lower limit comprising:

(a) a first switching network having an input and a plurality of parallel outputs corresponding to the radix of said register and being adapted to establish a conductive path between its input and one of its outputs according to a first digit in said register, (b) a first group of switching means adapted to be selectively closed in accordance with integers above that of said upper limit for said first digit, (c) a second group of switching means adapted to be selectively closed in accordance with the particular integer of said upper limit for said first digit, (d) each of said first and second groups having an output and a plurality of parallel inputs corresponding to said radix, (e) conductive means for supplying voltage to the input of said first switching network, (f) conductive means for connecting the parallel outputs of said first switching network to the parallel inputs of said first and second groups, (g) a second switching network having an input and a plurality of parallel outputs corresponding to said radix and being adapted to establish a conductive path between its input and one of its outputs according to a second digit in said register, (h) a third group of switching means adapted to be selectively closed in accordance with integers equal to or greater than that of said upper limit for said second digit, (i) said third group having an output and a plurality of parallel inputs corresponding to said radix, (j) conductive means connecting the output of said second group to the input of said second switching network.

(k) conductive means connecting the parallel outputs of said second switching network to the parallel inputs of said third group, (l) a third switching network having an input and a plurality of parallel outputs corresponding to said radix and being adapted to establish a conductive path between its input and one of its outputs according to said first digit, (m) a fourth group of switching means adapted to be selectively closed in accordance with integers below that of said lower limit for said first digit, (n) a fifth group of switching means adapted to be selectively closed in accordance with the particular integer of said lower limit for said first digit, (o) each of said fourth and fifth groups having an output and a plurality of parallel inputs corresponding to said radix, (p) conductive means for supplying voltage to the input of said third switching network, (q) conductive means for connecting the parallel outputs of said third switching network to the parallel inputs of said fourth and fifth groups, (r) a fourth switching network having an input and a plurality of parallel outputs corresponding to said radix and being adapted to establish a conductive path between its input and one of its outputs according to said second digit in said register, (s) a sixth group of switching means adapted to be selectively closed in accordance with the particular integer of said lower limit for said second digit, (t) said sixth group having an output and a plurality of parallel inputs corresponding to said radix, (u) conductive means connecting the output of the fifth group to the input of the fourth switching network.

(v) conductive means connecting the parallel outputs of the fourth switching network to the parallel inputs of the sixth group, (w) said indicating means having input means connected to the outputs of said first, third, fourth and sixth groups.

7. Apparatus according to claim 6 wherein said radix is ten, said register includes at least three digits, and said first and second digits are the two most significant digits in said register.

References Cited by the Examiner

UNITED STATES PATENTS

| | | | |
|---|---|---|---|
| 2,798,199 | 7/1957 | Potter | 235—151 X |
| 2,958,823 | 11/1960 | Rabier | 324—133 |
| 2,977,535 | 3/1961 | O'Conner et al. | 324—73 |
| 2,996,666 | 8/1961 | Baker | 324—73 |
| 3,027,542 | 3/1962 | Silva | 340—146.2 |

OTHER REFERENCES

1955, Richards, Arithmetic Operations in Digital Computers, Van Nostrand, chapter 8.

ROBERT C. BAILEY, *Primary Examiner.*

DARYL W. COOK, MALCOLM A. MORRISON, *Examiners.*